(12) United States Patent
Bray et al.

(10) Patent No.: US 8,306,854 B1
(45) Date of Patent: Nov. 6, 2012

(54) PAYROLL TIME MEASUREMENT AND REPORTING

(75) Inventors: Curtis A. Bray, Overland Park, KS (US); Rex A. Elbert, Oviedo, FL (US); Diane M. Hodge, Merriam, KS (US); Michelle R. McGhee, Tonganoxie, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 391 days.

(21) Appl. No.: 12/581,024

(22) Filed: Oct. 16, 2009

(51) Int. Cl.
*G06Q 30/00* (2006.01)
(52) U.S. Cl. ............... 705/8; 705/7; 705/9; 705/11
(58) Field of Classification Search ............ 705/7, 8, 705/9, 11
See application file for complete search history.

(56) References Cited

U.S. PATENT DOCUMENTS

2004/0260589 A1* 12/2004 Varadarajan et al. ............ 705/8
2009/0132579 A1* 5/2009 Kwang ........................ 707/102

* cited by examiner

*Primary Examiner* — Nga B. Nguyen

(57) ABSTRACT

A system is provided comprising a computer and application, that when executed, observes login and logout events at a client workstation enabling and disabling access to an operating system executing on the workstation. The system observes a first login and logout event and a second login and logout event occur in order. The system determines first and second exceptions when the time of the first login and second logout events vary from scheduled first login and second logout times by greater than first and second predetermined time intervals, respectively. The system determines a third exception when the time between the first logout and second login event exceeds a third predetermined interval. The system determines a fourth exception when either the first logout or second logout event does not occur before the end of the period. The system also reports the first, second, third, fourth exceptions to a workforce management function.

20 Claims, 5 Drawing Sheets

PAYROLL TIME MEASUREMENT AND REPORTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Individuals working for large organizations in customer service, technical support, information help desk, and claims processing positions are often situated at computer workstations for extended periods. The primary responsibility of such individuals may be to answer incoming telephone calls on an automated call distribution system. During the call and while conversing with the caller, the worker may access a private data network containing a plurality of enterprise software applications as well as access publicly available information from the Internet. The worker searches for information, may document the call in a new or existing incident record, and may initiate action to satisfy the caller's need. Such incoming call handling may be actively monitored by supervisors and measured for productivity using a variety of metrics and standards. Workers performing this type of labor are often compensated on an hourly as opposed to salaried basis and may be referred to as non-exempt. Non-exempt worker classification may be defined by government regulations. Under these regulations, such workers may be paid overtime wages for time worked in excess of a predefined quantity of hours per week and may be expected to account for hours and fractional hours worked. Organizations that employ non-exempt workers are subject to these regulations and may be penalized for violations.

SUMMARY

In an embodiment, a system of payroll time measurement and reporting is provided. The system comprises a computer system and an application, that when executed on the computer system, observes login and logout events at a client workstation, the login and logout events enabling and disabling access to an operating system executing on the client workstation. The system also observes a first login event, a first logout event, a second login event, and a second logout event that occur in order during a time period. The system also determines a first exception when the time of the first login event varies from a scheduled first login time by greater than a first predetermined time interval. The system also determines a second exception when the time of the second logout event varies from a scheduled second logout time by greater than a second predetermined time interval. The system also determines a third exception when a period of time between the first logout event and the second login event exceeds a third predetermined time interval. The system also determines a fourth exception when one of the first logout event and the second logout event does not occur before the end of the time period. The system also reports the first exception, the second exception, the third exception, and the fourth exception to a workforce management function.

In another embodiment, a processor-implemented method of payroll time measurement and reporting is provided. The method comprises a computer executing an electronic gate, the electronic gate requiring login before permitting access to applications needed to perform work, the login comprising entry of credentials. The method also comprises the computer reporting login events and logout events to an operations manager server. The method also comprises the operations manager server reviewing a collection of reported login events and logout events that occur during a time period, applying a set of rules, and determining a first exception, a second exception, a third exception, and a fourth exception to the set of rules. The method also comprises the operations manager server dismissing the third exception as directed by the set of rules and sending a report to an exception time reporting server describing the login events and logout events that occurred during the time period and further describing the first exception, the second exception, and the fourth exception. The method also comprises the exception time reporting server comparing the login events and logout events with a predetermined work schedule associated with the computer and the time period. The method also comprises the exception time reporting server dismissing the fourth exception based on coding associated with the predetermined work schedule. The method also comprises the exception time reporting server reporting the first exception and the second exception to a workforce management function.

In another embodiment, a processor-implemented method of payroll time measurement and reporting, comprising a workforce management function receiving a report from an exception time reporting server, the report describing a first exception and a second exception to a predetermined work schedule associated with a client workstation during a single work shift. The method also comprises the workforce management function searching for and locating information on a network permitting resolution of the first exception. The method also comprises the workforce management function searching for and not locating information permitting resolution of the second exception. The method also comprises the workforce management function sending a message to an operations manager server requesting information about automatically dismissed exceptions during previous work shifts associated with the client workstation. The method also comprises the workforce management function receiving information about the automatically dismissed exceptions and analyzing the second exception with reference to the automatically dismissed exceptions. The method also comprises the workforce management function forwarding the results of its analysis to a supervisory function for remediation.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
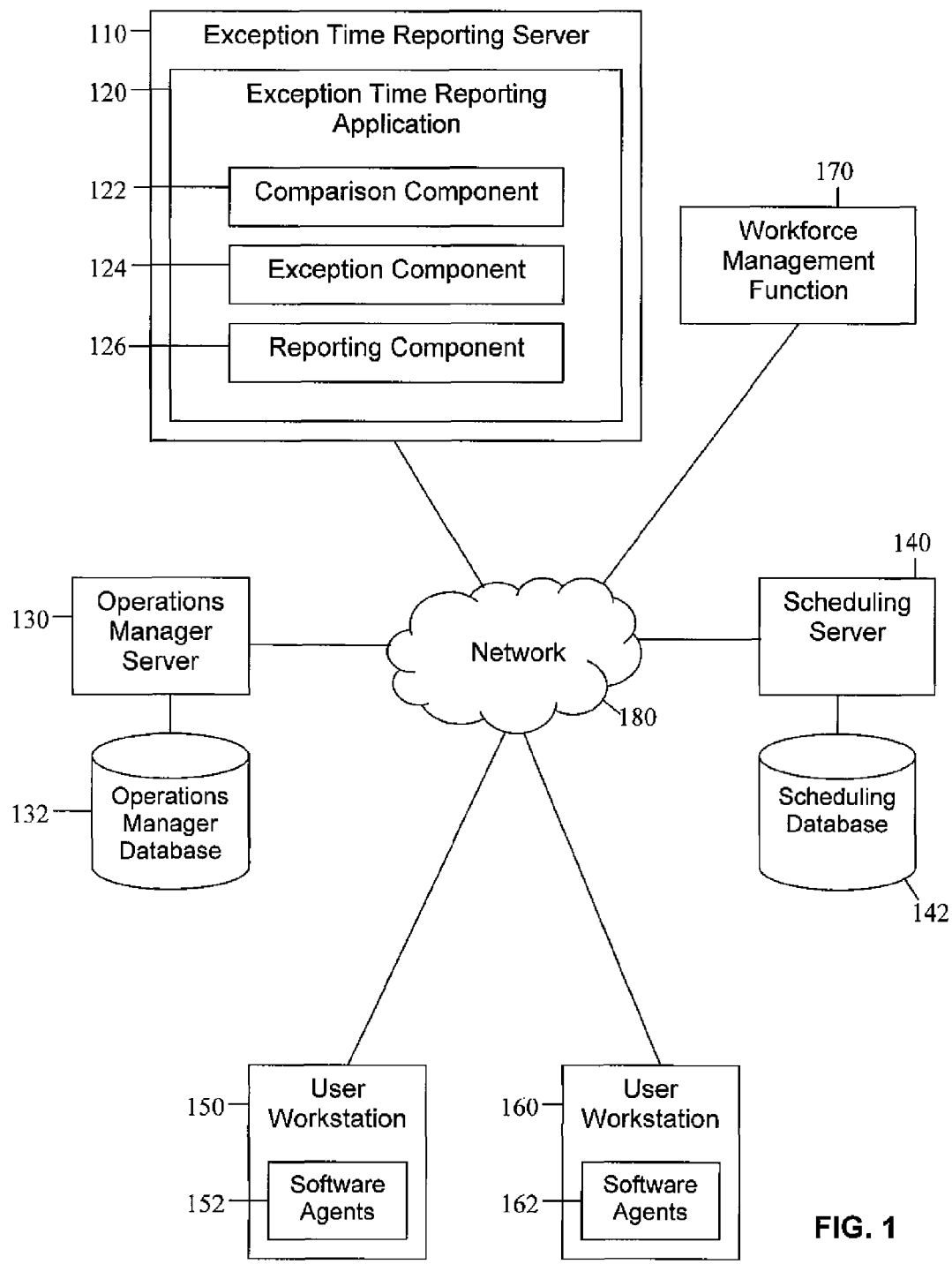
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a payroll time measurement and reporting system permit an employer to assure accurate compensation and enforce work schedule adherence by requiring employees to pass through an electronic gate to begin and end work periods. The system records employee login and logout events and permits employee access to applications needed to perform work only to logged in employees. The system prevents employees from performing work without being logged in and prevents supervisors from compelling employees to perform work that cannot be tracked, reported, and properly compensated. The system observes and records the initial login and final logout events for a work shift by an employee and compares the times of these events with the prescribed login and logout times described in a work schedule previously set for the employee. Initial login and final logout event times that differ from scheduled times by more than a predefined margin are noted and reported.

The system also notes combinations of logout and login events that occur during a work shift for scheduled breaks such as lunch and unscheduled events. The system investigates and resolves exceptions related to approved and non-approved logged-out periods by locating supervisor coding and documentation in the work schedule. The system reports on exceptions and absences that it cannot resolve to supervisory functions for remedial action. The system captures all time for work performed, because the computer-based tools needed to perform work cannot be reached without logging in and generating a date and time stamp for the event.

The present disclosure teaches the use of a software agent installed and perpetually running in the background on employee computers. In an embodiment, the software agent is closely coupled with the operating system of each employee computer and works in conjunction with an operations manager server. Alternatively, in an embodiment, at least some of the functionality of the software agent is built into the operating system. The operating system provides an execution environment for user applications and manages access to computer hardware resources such as memory, central processing unit (CPU), input, output, and network connectivity. For these reasons, in typical work environments user applications cannot execute without the knowledge of and support of the operating system. The software agent captures a date and time stamp of each employee login and logout activity to the operating system as it occurs and sends a record of the activity to the operations manager server. An employee cannot use his or her computer without first passing through the electronic gate provided by the locally-running software agent. No action by the employee is necessary to engage the system, and the employee is unaware of the operation of the system. The actions of the software agent and the operations manager server that receives, records, and analyzes date and time stamp records from the software agent take place without human intervention by employees, supervisors, or others.

Login and logout events by an employee during a time period, for example a twenty-four hour day, are subjected to rules associated with the job classifications of employees and their work schedules that are stored in a scheduling application for the time period. The operations manager server may determine if the initial login and final logout events for an employee occurred approximately when scheduled, each event occurring within an allowed range. The operations manager server also analyzes the time of logout and subsequent login during the work shift for the employee's lunch break to determine time and duration of the break. An exception time reporting server compares reported exceptions with the work schedule in an attempt to resolve exceptions by searching for notations, coding, or documentation provided by supervisory or other authorized functions explaining and excusing otherwise unexcused variances and absent periods. A daily reconciliation report may be produced noting unresolved exceptions to the work schedule wherein login and logout events deviated materially from their scheduled times. A workforce management function receives the daily reconciliation report from the exception time reporting server comparing actual events with the work schedule and describing exceptions. The function reviews the total time logged in, the times of the initial login and final logout events, and intervening logouts and logins during a work shift. The workforce management function seeks to resolve exceptions that were not resolved by the exception time reporting server in its review of the work schedule. Once exceptions and discrepancies have been resolved and actual time worked has been determined, the results are saved in the scheduling application and associated database. The results are also supplied to a payroll application that supplies its own coding for regular time, overtime, paid time off, unpaid time off, and other classifications and processes payment. The workforce management function may seek login and logout event information from the operations manager server on an ad hoc basis about any login and logout events to resolve exceptions and discrepancies and alert management to potential disciplinary and performance problems of users, supervisors, or others.

While an objective of the present disclosure may be to monitor worker compliance with work scheduling for management and disciplinary purposes, the present disclosure also teaches the tracking and recording of logged-in time to assure that all work performed is properly observed, recorded, and compensated. By requiring logged-in status to access applications necessary to perform work, the system seeks to assure that work cannot be performed without the employee receiving compensation for time logged in and worked. The system protects employees from rogue supervisors that may attempt to extract undocumented and uncompensated work from employees "off the clock."

Turning now to FIG. 1, a system 100 of payroll time measurement and reporting is provided. The system 100 comprises an exception time reporting server 110, an exception time reporting application 120, an operations manager server 130, an operations manager database 132, a scheduling server 140, a scheduling database 142, user workstations 150 and 160, a workforce management function 170, and a network 180.

The exception time reporting server 110 may be a computer system. Computer systems are discussed in greater detail hereinafter. The exception time reporting server 110 may comprise one computer or a plurality of computers, for example, a server farm wherein many server computers cooperate to share a processing load. The exception time reporting server 110 may comprise a plurality of computers that are located at different places, for example, to provide geographical diversity and increased service reliability. The exception time reporting server 110 executes one or more applications that provide labor time observation, tracking, and reporting services including the exception time reporting application 120.

The exception time reporting application 120 executes on the exception time reporting server 110 and compares reports of login and logout events and variances received from the operations manager server 130 with work schedules provided by the scheduling server 140. The period of time under consideration containing work shifts may be a specific twenty-four hour period. The exception time reporting application 120 in its review of reporting received from the operations manager server 130 may determine that the initial login and final logout events did not occur at the times prescribed in the work schedule associated with the user of the user workstation 150. The exception time reporting application 120 also examines combinations of logout and login events that occur during the work shift. The combinations or pairs of logout and login events represent instances of a user of a workstation 150 logging out and leaving the work area for an excused or unexcused reason and later logging back in. Such instances may also arise from a user losing logged-in status or intentionally discontinuing logged-in status due to workstation or network technical problems. The exception time reporting application 120 examines logged out periods during a work shift and compares them to the work schedule corresponding to the work shift. The exception time reporting application 120 attempts to determine if logged out periods are noted in the work schedule as previously scheduled and therefore approved. The exception time reporting application 120 may locate coding or other notations entered into the scheduling server 140 by an authorized supervisor that approves one or more logged out periods by a user workstation 150.

After completing its comparisons and clearing approved exceptions, the exception time reporting application 120 creates a daily reconciliation report describing remaining unresolved exceptions to the work schedule. The remaining exceptions may be instances of the initial login event and/or the final logout event for a work shift occurring at time variances greater than allowed from the scheduled times of initial login and final logout for the work shift. The exceptions may be logged-out periods during the work shift not previously documented as excused in the work schedule. The exceptions may be an approved break, such as for a lunch period, of duration longer than permitted or significantly shorter than scheduled. The exceptions may be unexplained absences from the work area. The exception time reporting application 120 assists the workforce management function 170 in resolving exceptions to a work schedule and in determining the correct amount of time worked and eligible for compensation. When exceptions have been resolved and actual time worked has been determined and finalized, the exception time reporting application 120 may assist in storing the resolved work results in the scheduling database 142 for future reference.

The exception time reporting application 120 comprises the comparison component 122 that on a daily or other regular basis receives a report from the operations manager server 130 and a work schedule from the scheduling server 140 for a user workstation 150. The report received from the operations manager server 130 and the work schedule received from the scheduling server 140 are associated with a particular user workstation 150 and a period of time. The period of time may be a twenty-four hour period within which a work shift described by the work schedule falls. The comparison component 122 compares the times of various login and logout events by the user workstation 150 during the time period with the work schedule in light of exceptions noted in the report from the operations manager server 130. In an embodiment, the period of time covered is from 12:00 AM to 11:59:59 PM of a calendar day and the work schedule received from the scheduling server 140 for the user workstation 150 might describe a work shift beginning at 8:00 AM and ending at 5:00 PM with a single lunch break. In an embodiment, the system 100 may permit eight minutes leeway before and after the scheduled times of initial login and final logout for the user workstation 150 such that the user workstation 150 may initially log in between 7:52 AM and 8:08 AM and finally log out between 4:52 PM and 5:08 PM and not be subject to an exception. The report received from the operations manager server 130 will note exceptions to initial login and final logout times as well as exceptions regarding the lunch break. The report also may describe other logged out periods that occurred during the work shift.

In an embodiment, the present disclosure may teach a system 100 of payroll time measurement and reporting in a call center environment in which individuals situated at user workstations 150, 160 enter credentials to log into a user workstation 150, 160, additionally log into an automated call distribution (ACD) system, and answer incoming telephone calls from customers or others seeking information, technical assistance, or other customer service. Because an individual situated at and logged in at a user workstation 150 may be engaged in an inbound call at the time a scheduled lunch break is about to begin and cannot terminate the call, the system 100 may permit flexibility regarding the time that a user workstation 150 logs out to begin a scheduled lunch break. The system 100 may only enforce the duration of this break as long as the beginning times of the breaks as established by logout is reasonably near the scheduled beginning time of the breaks.

In comparing the report received from the operations manager server 130 with the work schedule received from the scheduling server 140 for a particular period of time and user workstation 150, the comparison component 122 also may be alerted to additional periods of time that the user workstation 150 was logged out. The comparison component 122, in comparing the report from the operations manager server 130 with the work schedule received from the scheduling server 140, may discover that the additional periods of logged out time were approved by a supervisor and are supported by the supervisor with a code, notation, or documentation. The work schedule provided by the scheduling server 140 may contain the appropriate coding or may contain pointers to supporting documentation. The time associated with these approved absences may ultimately be compensated time or it may not be compensated time depending on the circumstances, supervisor coding and notation, and later review by other components of the system 100. The system 100 also provides for a user workstation 150 to be automatically locked and therefore made inaccessible if the user workstation 150 is idle without keyboard or mouse activity for an interval, for example twelve minutes. Periods such as these would be detected and reported by the comparison component 122.

The present disclosure provides for workstation locking and unlocking activities to be observed, tracked, and recorded in the same manner as the more comprehensive network logout and login authentication activities. A particular user may be in the habit of unlocking and locking his or her user workstation 150 to begin and end his or her work shift, respectively, and remain steadily logged into and authenticated by the network 180. A second user may, by contrast, choose to log in and log out of the network 180 but leave the user workstation 150 fully booted and running with the operating system in an operative though inaccessible state. A third user may alternatively choose to perform a full and orderly shut down of the user workstation 150 at the end of a work shift and physically "cold boot" the user workstation 150 at the beginning of the following work shift. The operations manager server 130 regards each of these three distinct practices in the same way, as login and logout activities by the user workstation 150. The present disclosure provides user workstations 150, 160 the flexibility to be merely locked but logged into the network 180, to log out of the network 180 but remain running though inaccessible, or fully shut down. The operations manager server 130 may not report these three login and logout scenarios differently from each other in manners recognizable by the comparison component 122 for its purposes. How a particular user may log in and log out of a user workstation 150, however, may be detectable and reportable to the other components of the system 100 in their subsequent and more comprehensive exception analysis and reporting to management. A record of a user's log in and log out practices may be of value to the workforce management function 170 at a future time in resolving time worked, compensation, performance, and disciplinary issues related to a user or performance issues related to a supervisor.

The exception time reporting application 120 also comprises the exception component 124 that may identify exceptions associated with a user workstation 150 that could not be resolved by the comparison component 122 when it compared the report of login and logout events received from the operations manager server 130 with the work schedule received from the scheduling server 140. Exceptions include logged out periods during a work shift that are not accompanied by supervisor approval coding in the scheduling server 140. Exceptions identifiable by combinations of logout and subsequent login events that are of short duration, for example seven minutes or less, may be automatically excusable by the operations manager server 130 and disregarded as these events may be associated with urgent personal breaks or workstation or network outages beyond the control of the user. Such brief exceptions are dismissed by the operations manager server 130 and not included in the report sent to the exception time reporting application 120. The exception component 124 reviews all exceptions not previously resolved by the comparison component 122 and applies rules for dismissing exceptions that may be justified by information provided by the scheduling server 140 that the comparison component 122 may not have earlier detected. The exception component 124 compiles a daily exception report containing a description of exceptions to the work schedule for a user workstation 150 that both the exception component 124 and the comparison component 122 cannot resolve by locating coding in the scheduling server 140 associated with unexplained logged out periods. The exception component 124 also notes exceptions arising from anomalies such as when a login event is the last event during a twenty-four hour period. This may indicate that an employee returned to the office or logged in from home before midnight to handle work, for example an urgently escalated customer call. The exception component 124 captures information reported by the operations manager server 130 and reports to the workforce management function 170 events marked by logged out periods that depart from a common scenario of a user workstation 150 initially logging in, taking appropriate breaks, and finally logging out, all occurring within approximately an eight or nine hour period sometime between 12:00 AM and 11:59:59 PM of a calendar day. If an employee works a shift that begins before midnight of one calendar day and ends after midnight the following day, the components of the system 100 will adjust for this arrangement based on the employee's work schedule.

The exception time reporting application 120 also comprises the reporting component 126 that sends the daily exception report generated by the exception component 124 to the workforce management function 170 for its analysis. The reporting component 126 on a daily or other regular basis forwards the daily reconciliation report that contains the exceptions reported by the operations manager server 130 that trigger deeper review and access to more information and possibly management involvement. The reporting component 126 also may periodically draw historical data stored in the operations manager database 132, scheduling data stored in the scheduling database 142, and information from other sources. The reporting component 126 at various times may perform compilations and analyses on this data and prepare reports for the workforce management function 170 as well as supervisors and executive management in their normal workforce and operations management activities as well as in complying with requirements of governmental regulatory departments and agencies, insurers, and other outside entities.

The operations manager server 130 receives reports of login and logout events by user workstations 150, 160 from software agents 152, 162 executing on user workstations 150, 160. The login and logout events reported by the software agents 152, 162 may comprise locking and unlocking of a user workstation 150 while remaining authenticated to a network 180, login and logout events to the network 180 with the user workstation 150 remaining running but inaccessible, or full network log out events with the user workstation 150 being physically shut down and restarted at the beginning of the next work shift. The operations manager server 130 may or may not recognize and report these types of events differently but the system 100 regards these events uniformly, as one of the securing the ability to access applications and hence perform work and the other as the closing off of that ability indicating the leaving of the work area and cessation of work. The operations manager server 130 on a daily or other regular basis may create a report of login and logout events that it furnishes to the exception time reporting server 110. The operations manager server 130 may perform other duties unrelated to the recording and analysis of login and logout events by user workstations 150, 160. The operations manager server 130 interacts directly with the software agents 152, 162 running on user workstations 150, 160 and receives reports of login and logout events entered into the graphical user interfaces of the user workstations 150, 160 and processed by the operating systems running on the user workstations 150, 160.

The operations manager server 130 records and analyzes the times of login and logout events during a time period, typically a twenty-four hour calendar day. It records the initial login event and final logout event during each time period. It consults rules regarding leeway amounts of time permitted before and after the scheduled initial login time and the scheduled final logout time within which an employee may log in and log out. Login and logout events that occur outside of those leeway periods are noted as exceptions by the operations manager server 130. These exceptions are reported to the exception time reporting application 120.

After the initial login event is recorded to begin a work shift, the operations manager server 130 then receives a record of the subsequent logout event and waits for the next login event. Under normal circumstances, the logout event that immediately follows the initial login event marks the beginning of the designated lunch break. Upon receiving the time of that first logout event, the operations manager server 130 sets a timer and waits until the next or second login event, normally indicating the return from lunch break. When the time elapsed between the first logout event and the second login event exceeds or is markedly shorter than a predetermined interval, for example sixty, ninety, or one hundred twenty minutes, this indicates that the employee may have exceeded his or her allowed lunch break or attempted to work overtime in the case of a shortened break. The operations manager server 130 notes and reports these exceptions. The amount of the predetermined interval for lunch break is described in rules consulted by the operations manager server 130.

When a logout event occurs, the operations manager server 130 records the time of the logout event and waits until the occurrence of the next login event. When a twenty-four hour or other measured time period ends, the system 100 assumes that the last logout event that occurred was the final logout event ending the work shift of the employee. If the twenty-four hour time period ends and the last recorded event was a login event, meaning that a user workstation 150 was still logged in at midnight, the operations manager server 130 reports an exception. The exception later may be resolved by a subsequent observation of the user workstation logging out after midnight and/or the work schedule. However, because the end of the twenty-four hour period marks the closing of each cycle, the exception is created and delivered to the workforce management function 170 for its review and resolution. In an embodiment, because user workstations 150, 160 may be configured to automatically lock themselves after a period of inactivity, for example fifteen minutes, instances of users forgetting to either log out of or lock their workstation when they complete their work shifts will not be problematic as the automatic workstation locking will be observed as logout events.

The operations manager server 130, in its report that it furnishes to the exception time reporting application 120, may report as true exceptions only potential violations related to the initial login event, the mid-shift break of about sixty to one hundred twenty minutes, and the final logout event during the twenty-four hour cycle. Additional logged out periods are noted and reported to the time reporting application 120 but not determined to be true exceptions until the comparison component 122 and the exception component 124 have examined all of the information provided by the operations manager server 130 in comparison with the work schedule received from the scheduling server 140.

The operations manager server 130 also disregards and does not report brief logged out periods, for example those less than ten minutes in duration, because those periods may have been necessitated by a user workstation 150 needing to be shut down and rebooted for technical reasons or for the employee using the user workstation 150 needing to take a brief, emergency personal break. While the operations manager server 130 does not report brief logged out periods, it may save records of all login and logout events and logged out periods, no matter how short, as these records may be of value at later dates in discussions, actions, and official proceedings involving an employee's compensation or performance. The present disclosure teaches various methods of the timing of the software agents 152, 162 sending reports of login and logout events to the operations manager server 130 and various methods of the operations manager server 130 applying rules to login and logout events to determine compliance or variance by user workstations 150, 160. In one embodiment, the software agents 152, 162 may send captured login and logout events to the operations manager server 130 on a real time basis as they are observed and in an alternate embodiment the software agents 152, 162 may capture and locally store all login and logout events during a calendar day and send a single report of the events to the operations manager server 130 at the end of the calendar day for batch processing. Working with the software agents 152, 162, the operations manager server 130 may determine compliance or variance in a similar manner, either on a real time basis as reports are received or on a batch basis at the end of the calendar day.

The operations manager database 132 is associated with the operations manager server 130 and may store historical data related to login and logout events by user workstations 150, 160. The historical data may be useful in performing analyses about the work productivity and performance of a particular employee or employees or in making productivity improvements to an operation at large. The historical data may be vital in supporting discussions with governmental regulatory departments and agencies, insurers, and other outside entities and in protecting an employer in legal proceedings.

The scheduling server 140 sets the work schedules for individuals logging into user workstations 150, 160 to begin work. Work schedules are predetermined for workers, provided to the workers, and stored in the scheduling server 140. Work schedules describe the scheduled initial log in time, the scheduled final log out time, and allowed breaks for lunch or mid-shift meal as well as any additional authorized breaks. The scheduling server 140 permits supervisors and other authorized parties to make code or notation entries into work schedules for a specific user workstation 150 to authorize paid absences for vacation, training, work-related travel, or other activities as well as provide approval for time not worked but paid during illness or for allowed personal time off. The scheduling server 140 on a daily or other regular basis furnishes a work schedule with this coding to the exception time reporting application 120. The comparison component 122 then compares this annotated work schedule for the previous day or other time period with the report received from the operations manager server 130 containing the listing of login and logout events for the user workstation 150. Some employees may work in a "split shift" type of arrangement wherein an extended break period of several hours separates two work periods that together total a normal shift. The operations manager server 130 applies rules specific to these types of employees and analyzes login and logout events accordingly.

The scheduling server 140 also later receives from the exception component 124 the work schedule for the previous day or other time period after it has been fully resolved, adjusted for variances, and finalized with actual time worked by the workforce management function 170. The scheduling server 140 sends the adjusted schedule to the payroll function for processing and payment.

The scheduling database 142 stores historical information about the initial, adjusted, and finalized work schedules for past work periods. As with information stored by the operations manager database 132, the information stored in the scheduling database 142 may be useful in the future in addressing compensation disputes, in discussions with governmental regulatory departments and agencies, insurers, and other outside entities and in protecting an employer in legal proceedings.

User workstations 150, 160 are computers used by individuals whose time worked is measured by login and logout events executed at the computers. The login and logout events are used by other components of the system 100 to establish availability to perform work. A worker cannot gain access to the applications necessary to perform work without being logged in, whether the necessary applications are accessible on a server across the network 180 or executing locally on the user workstations 150, 160. The present disclosure prevents a worker from being able to perform work without time worked being observable and measurable by using workstation and system login actions to permit access to applications.

Software agents 152, 162 execute on the user workstations 150, 160 and are closely integrated with the operating systems that control the basic resources of the user workstations 150, 160. The software agents 152, 162 observe and report login and logout events that take place on the user workstations 150, 160 to the operations manager server 130. The software agents 152, 162 record a date and time stamp for every login and logout event that takes place on the user workstations 150, 160. A user cannot access applications essential to perform work without completing a login event that is recorded and observed by the software agents 152, 162 and sent to the operations manager server 130.

The workforce management function 170 receives the daily reconciliation report from the reporting component 126 containing exceptions to a work schedule associated with a user workstation 150 for a work shift. The daily reconciliation report contains exceptions that other components of the exception time reporting application 120 were not able to resolve by locating codes or other notations associated with the work schedule for the user workstation 150 that directly excused specific logged out periods. The workforce management function 170 examines exceptions in the daily reconciliation report related to a user workstation 150 initially logging in or finally logging out at times outside of the allowed intervals. The workforce management function 170 examines lunch breaks and other permitted breaks that may be taken at the wrong times or may be too long or too short in duration. If a user workstation 150 has worked overtime, the workforce management function 170 will search for a code or other entry associated with the work schedule indicating that the overtime was approved. The workforce management function 170 examines other logged out periods during the work shift that are of a material duration and are not explained. The workforce management function 170 may search for and access widely dispersed information about vacation schedules, training schedules, fire drills, company functions, building emergencies, or building closures due to weather or site events to explain any absences not previously explained and resolved.

When the workforce management function 170 has exhausted all of its resources to resolve any remaining unexcused absences as evidenced by logout and subsequent login events and login events as the final event, it may prepare a report for management to use in remedial action with employees including adjusting future work schedules. The workforce management function 170 may reconcile the remaining unexcused and unresolved absences by entering variances back into the scheduling server 140. This action adjusts the work schedule for the work shift under examination for the exceptions and finalizes the amount of time actually worked during that work shift. The adjusted work schedule saved in the scheduling server 140 is sent by the exception component 124 to a payroll system. The payroll system may make determinations regarding overtime and vacation pay in addition to regular pay and, after applying its own controls, executes payroll compensation.

In an embodiment, the workforce management function 170 may comprise resources that are organizationally segregated from line supervisory functions that oversee line workers performing work at user workstations 150, 160. Some functionality, applications, and decision processes of the workforce management function 170 may not be accessible by line supervisory functions. A purpose of the workforce management function 170 is to support and reinforce the objectivity, integrity, and fairness of the system, protect the legal rights of workers to fair compensation, and shield employers from liability arising from charges of tampering and duress by line supervisors. The workforce management function 170 may have the authority of final decision on time worked by individuals working at user workstation 150. The workforce management function 170 may advise line supervisory functions of potential performance problems evidenced by unexcused absences and other exceptions but line supervisory functions may not be permitted to override decisions reached by the workforce management function 170.

The network 180 promotes communication between the components of the system 100. The network 180 may be any communication network including a public data network (PDN), a public switched telephone network (PSTN), a private network, and/or a combination thereof.

Figure 2A:
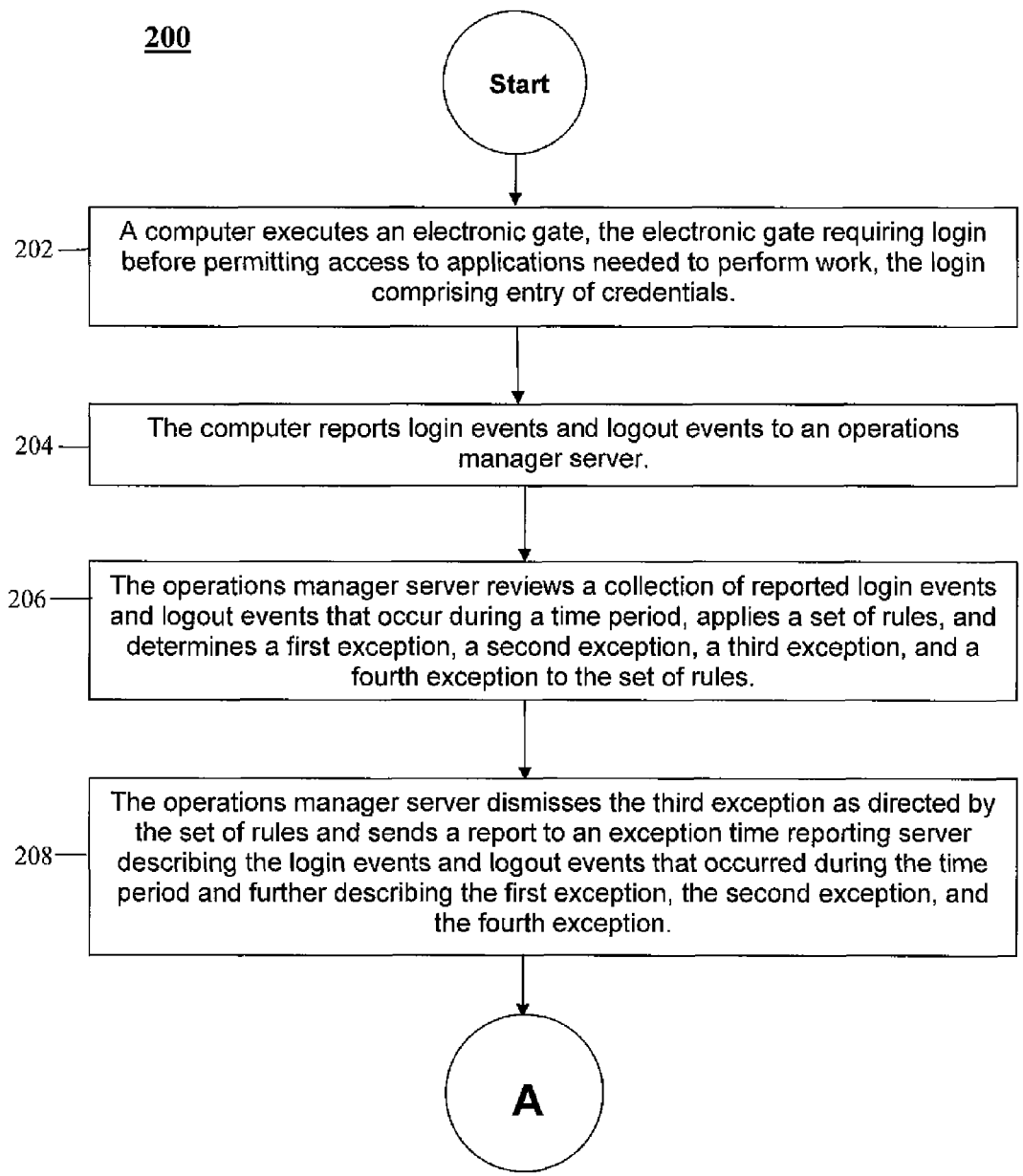
FIG. 2a and FIG. 2b are two stages of a flow chart illustrating a method according to an embodiment of the disclosure.
Figure 2B:
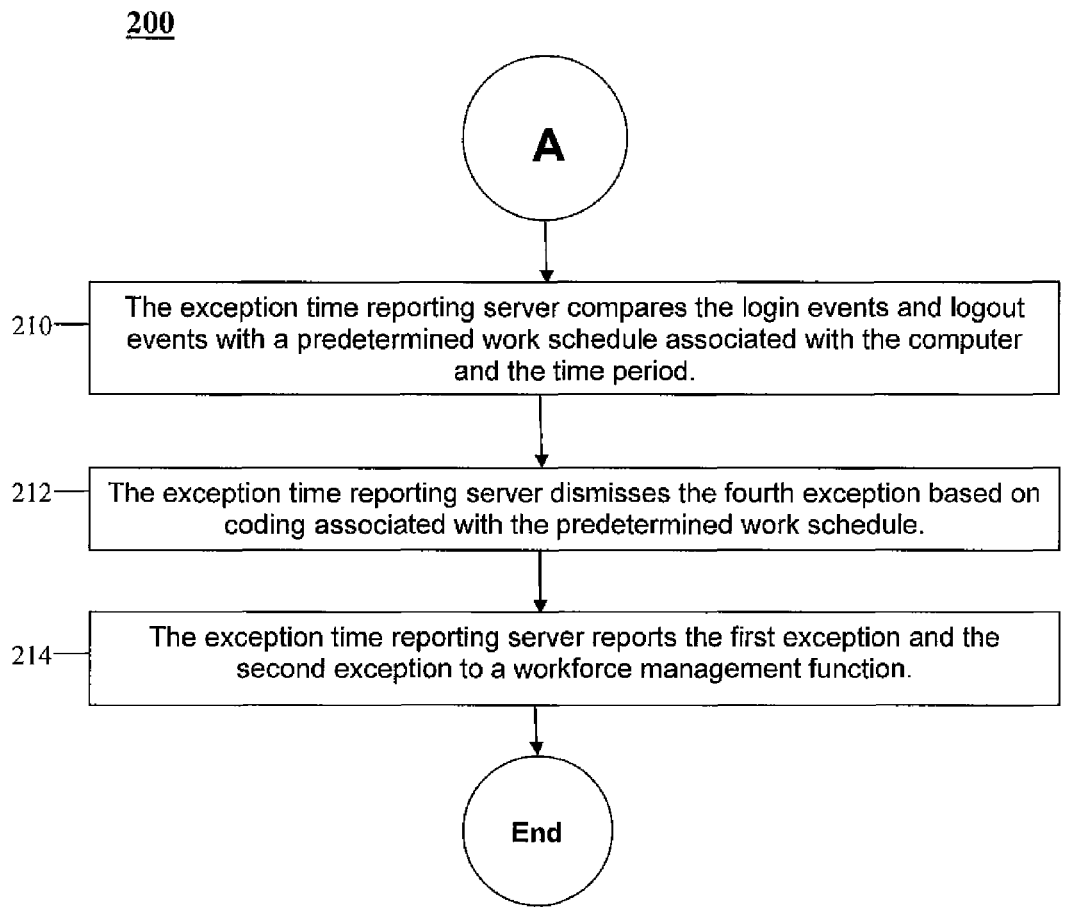

Turning now to FIG. 2a and FIG. 2b, a method 200 of payroll time measurement and reporting is provided. At block 202, a computer, in an embodiment the user workstation 150, is executing an operating system that requires login before allowing access to applications needed to perform work. In an embodiment, an individual working in a call center receiving incoming calls from customers cannot provide assistance to callers without using a variety of software applications available on the user workstation 150. Those applications and all other application functionality of the computer cannot be accessed without the user first logging in.

At block 204, the computer reports login and logout events to an operations manager server 130. The software agent 152 installed on the user workstation 150 and coupled with the operating system observes the time and date stamp of login and logout events and reports the events to the operations manager server 130. The software agent 152 effectively constitutes an electronic gate through which a user must pass before being able to begin work.

At block 206, the operations manager server 130 reviews login and logout events that occurred during a time period, in an embodiment a twenty-four hour day, and applies rules to the login and logout events. The rules describe how and when exceptions are to be generated regarding login and logout events by the user workstation 150. In an embodiment, the operations manager server 130 may access a single set of rules for all user workstations 150, 160 associated with employees of a certain job description. In the method 200, upon applying the rules, operations manager server 130 generates a first exception, a second exception, a third exception, and a fourth exception from its review of login and logout events by the user workstation 150 during the time period. These exceptions may be related to initial login and final logout events occurring outside of their permitted leeway time frames, may be related to the predetermined time interval for lunch break not receiving compliance, or may be related to another unexplained logged out period of material duration. When a logged out period of material duration other than lunch break is identified, the operations manager server 130 may report it without being able to provide input as to the reason for the logged out period.

At block 208, the operations manager server 130 dismisses the third exception as directed by the rules because the third exception is determined to be a logged out period of short duration, for example six minutes, and not warranting further review. At block 208, the operations manager server 130 also creates a report and sends it to the exception time reporting server 110, the report describing the login and logout events other than those associated with the third exception, the report describing the first exception, the second exception, and the fourth exception.

At block 210, the exception time reporting server 110 compares the report received from the operations manager server 130 with the work schedule for the same time period received from the scheduling server 140. The exception time reporting server 110 attempts to find coding or other notation associated with the work schedule and entered by a supervisor that excuses any of the first exception, the second exception, and the fourth exception which at this point remain unexplained.

At block 212, the exception time reporting server 110 finds coding associated with the work schedule for the time period that permits the exception time reporting server 110 to dismiss the fourth exception. In an embodiment, the exception time reporting server 110 may have found a code inserted into the work schedule by the supervisor of the user of the user workstation 150 excusing the user for the logged out period. In an embodiment, the user may have logged out to leave the workplace and travel to a physician for an appointment.

At block 214, the exception time reporting server 110 sends a daily exception report to the workforce management component 170 reporting the first exception and the second exception. While the operations manager server 130 was able to resolve and dismiss the third exception because it was short in duration and the exception time reporting server 110 was able to resolve the fourth exception by finding supervisor coding that specifically excused the fourth exception, in the method 200 the exception time reporting server 110 was unable to locate coding in the work schedule associated with either the first exception or the second exception that explained or even mentioned the exceptions. When the exception time reporting server 110 is unable to explain or resolve exceptions identified by the operations manager server 130, it sends a daily reconciliation report to the workforce management function 170 for its review. At the conclusion of the method 200, the first exception and the second exception identified by the operations manager server 130 remain unexplained and unresolved.

Figure 3:
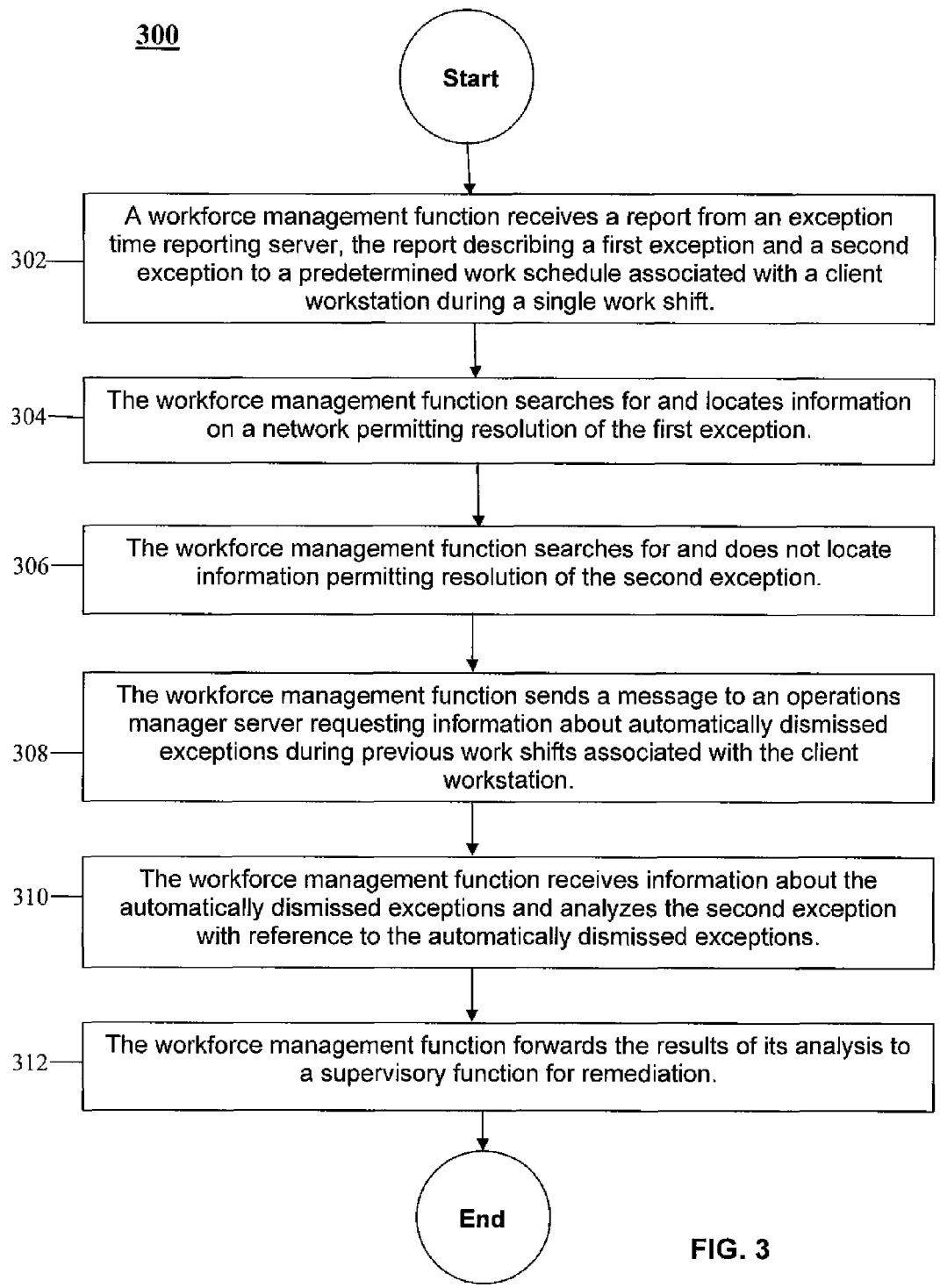
FIG. 3 is a flow chart illustrating another method according to an embodiment of the disclosure.

Turning now to FIG. 3, a method 300 of payroll time measurement and reporting is provided. Beginning at block 302, a workforce management function 170 receives a daily reconciliation report from an exception time reporting server 110, the report describing a first exception and the second exception to a work schedule associated with a user workstation 150 for a particular time period. In an embodiment, the workforce management function 170 receives the daily reconciliation report from the exception time reporting server 110 because the exception time reporting server 110 previously was not able to resolve either the first exception or the second exception by searching the work schedule for the user workstation 150 for coding or other notations entered by supervisors that approve the logged out periods described by the exceptions. In an embodiment, the method 300 may be viewed as a continuation of the method 200 wherein two other exceptions were resolved by being ruled as short in duration in one case and approved by a supervisor in the other case.

At block 304, the workforce management function 170 searches for and locates information permitting resolution of the first exception. The workforce management function 170 may have determined from examining information about the site at which the user workstation 150 is located that a fire drill or other emergency preparedness drill took place and was not noted by the supervisor of the user of the user workstation 150 because the supervisor is situated in a different building or in a different city and was not made aware of the drill. The workforce management function 170 is charged with resolving exceptions and accessing available resources to accomplish such resolution. The workforce management function 170 accesses resources that may not be available to the exception time reporting server 110.

At block 306, the workforce management function 170 searches for and is unable to locate any information in any of its resources explaining and permitting resolution of the second exception. The second exception at this point of the method 300 remains unexplained and may become subject to review by a supervisor associated with the user of the user workstation 150.

At block 308, the workforce management function 170 sends a message to the operations manager server 130 requesting information about exceptions from previous work periods that were automatically dismissed because the exceptions were short in duration. In an embodiment, the workforce management function 170 may seek to determine if there is a pattern of the user of the user workstation 150 leaving the work area at about the same time every day. The uncertainty of the workforce management function 170 may have been caused by the unresolved status of the second exception. The workforce management function 170 may request information on an ad hoc basis from the operations manager server 130 about logged out periods of any duration and any other aspect of login and logout events that it deems may be useful in resolving exceptions and investigating potential issues regarding users, supervisors, or others.

At block 310, the workforce management function 170 receives the requested information about the exceptions during previous work periods that were automatically dismissed because they were short in duration. In analyzing these exceptions in conjunction with information it has about the second exception, the workforce management function 170 may determine that these short exceptions generally occur at about the same time every day and at about the time the second exception occurred on the immediately previous day. The user of the user workstation 150 may have somehow learned that exceptions of duration shorter than eight minutes, for example, are disregarded and not reported. They user may then have fallen into the habit of taking unreported seven minute breaks during his friends' lunch break. On the day the second exception was detected, the user may accidentally have been logged out eight minutes or longer and was subject to an exception.

At block 312, the workforce management function 170 forwards the results of its analysis at block 310 to the supervisor of the user of the user workstation 150. The supervisor may then approach the user to discuss the matter and attempt to resolve it.

While the method 300 described the tracking and analysis of an unresolved exception related to the conduct of an employee, the components of the system 100 may also be used to identify behaviors of supervisors that may require remediation. While the present disclosure but not described herein may suggest methods of monitoring workplace activity to support remedial and disciplinary action, the present disclosure also suggests methods of properly and fairly observing, tracking, reporting, and compensating work performed by users of user workstations 150, 160. An objective of other methods that may be suggested by the present disclosure is that the time for any work performed is captured and measured. By barring access to software applications needed to perform work until a login is performed at the user workstation 150, the present disclosure teaches that work cannot be performed unless the time associated with that work is measured and reported using components and methods beyond the control of employees and supervisors.

Some embodiments of the present disclosure may attempt to modify the system and methods described and use physical smart card implementations, thin client implementations, biometric login methods, and implementations that alter the active directory database of the network 180. While the present disclosure does not expressly preclude such implementations, the cost of such implementations may be determined to be excessive and the practicality of such implementations may be determined to be unworkable.

The present disclosure may teach the use of acceptable alternate methods of marking a login or logout event when a user is unable to log into or log out of a user workstation 150 in compliance with work schedule for reasons beyond the user's control. In an embodiment, a user may work in a large call center and answer incoming calls on an automated call distribution (ACD) system. Users in these environments may separately log into the automated call distribution (ACD) system in addition to logging into the data network 180 as described herein. In the event a user of a user workstation 150 cannot log into or out of his or her user workstation 150 because it is unavailable, a login or logout action in the automated call distribution (ACD) system may be captured and noted in the work schedule by a supervisor. The operations manager server 130 would mark an exception because the expected login or logout at the user workstation 150 did not occur, but the exception time reporting server 110 would discover the notation made by the supervisor into the work schedule and mark the exception as resolved.

In an embodiment, some user workstations 150, 160 may be installed with additional hardware components and software files permitting the user to place and receive telephone calls over the Internet or other data network through the user workstations 150, 160. In embodiments using such "softphone" applications, separate login and logout events at the user workstations 150, 160 and into a traditional automated call distribution (ACD) system would not take place because voice and data functionality would effectively be delivered by the single component, the user workstations 150, 160.

Figure 4:
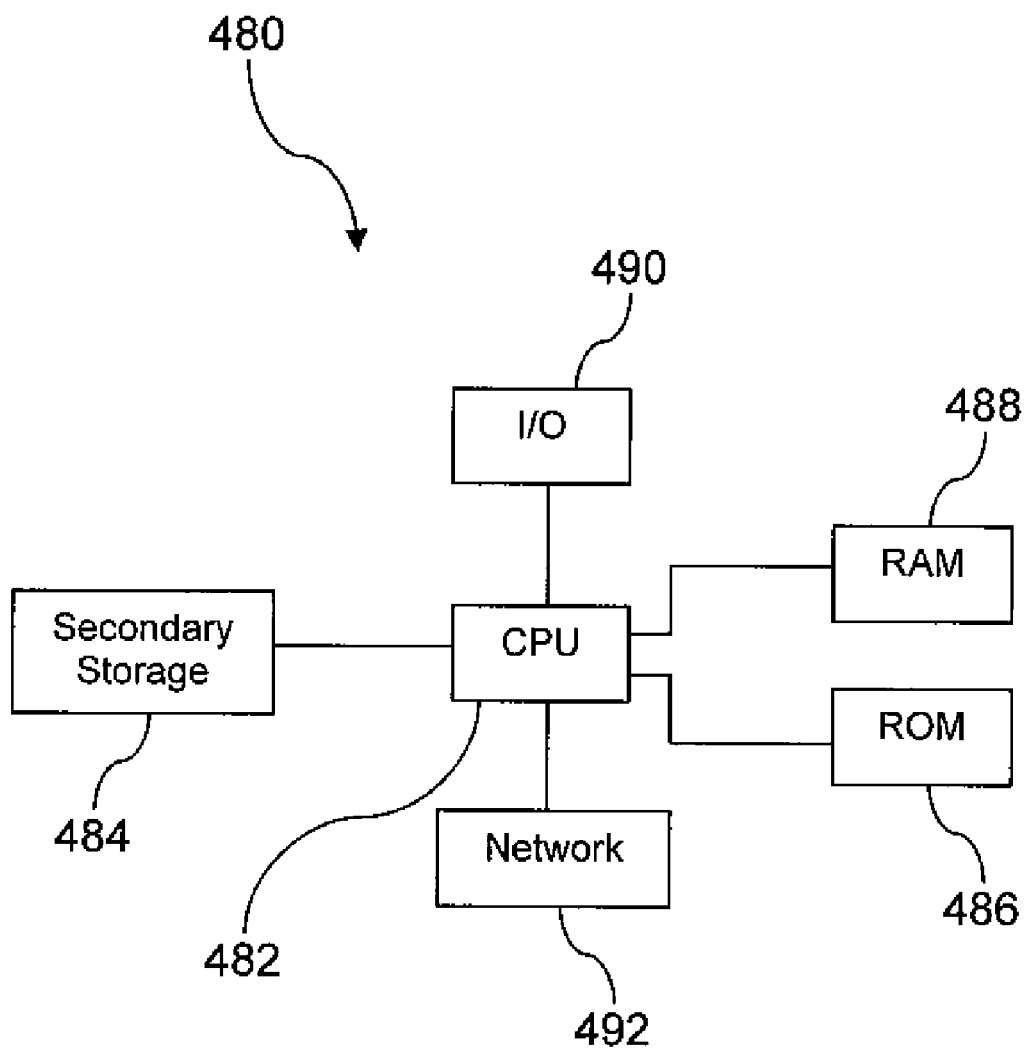
FIG. 4 illustrates an exemplary computer system suitable for implementing the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), and/or worldwide interoperability for microwave access (WiMAX) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system of payroll time measurement and reporting, comprising:

a computer system;

an application, that when executed on the computer system, observes login and logout events at a client workstation, the login and logout events enabling and disabling employee access to a workplace operating system executing on the client workstation, respectively;

observes a first login event, a first logout event, a second login event, and a second logout event occur in order during a time period;

determines a first payroll time exception when the time of the first previously observed login event varies from a scheduled first login time by greater than a first predetermined time interval;

determines a second payroll time exception when the time of the second previously observed logout event varies from a scheduled second logout time by greater than a second predetermined time interval;

determines a third payroll time exception when a period of time between the first previously observed logout event and the second previously observed login event exceeds a third predetermined time interval;

determines a fourth payroll time exception when one of the first previously observed logout event and the second previously observed logout event does not occur before the end of the time period; and reports the first payroll time exception, the second payroll time exception, the third payroll time exception, and the fourth payroll time exception to a workforce management function.

2. The system of claim 1, wherein observation of login events and logout events enforces adherence to a predetermined work schedule and wherein observation is assisted by a software agent executing on the client workstation sending information about login and logout events to the application.

3. The system of claim 1, wherein access to the operating system is required to use software applications necessary to perform work.

4. The system of claim 1, wherein the time period is twenty four hours in duration beginning at 12:00 AM and ending at 11:59:59 PM of each day.

5. The system of claim 1, wherein the first previously observed login event begins a measured work period and the second previously observed logout event ends the measured work period described by the predetermined work schedule.

6. The system of claim 1, where the first previously observed logout event begins a permitted work break and the second previously observed login event ends the permitted work break, the permitted work break described by the predetermined work schedule.

7. The system of claim 1, wherein previously observed login events and previously observed logout events comprise entry of proper credentials at the client workstation one of resulting in authentication with a network and unlocking the client workstation wherein the client workstation is currently authenticated with the network.

8. A processor-implemented method of payroll time measurement and reporting, comprising:
a computer executing an electronic gate, the electronic gate requiring login before permitting employee access to applications needed to perform work, the login comprising entry of credentials;
the computer reporting previously observed login events and previously observed logout events to an operations manager server;
the operations manager server reviewing a collection of reported previously observed login events and reported previously observed logout events that occur during a time period, applying a set of rules, and determining a first payroll time exception, a second payroll time exception, a third payroll time exception, and a fourth payroll time exception to the set of rules;
the operations manager server dismissing the third payroll time exception as directed by the set of rules and sending a report to an exception time reporting server describing the previously observed login events and previously observed logout events that occurred during the time period and further describing the first payroll time exception, the second payroll time exception, and the fourth payroll time exception;
the exception time reporting server comparing the previously observed login events and previously observed logout events with a predetermined work schedule associated with the computer and the time period;
the exception time reporting server dismissing the fourth exception based on coding associated with the predetermined work schedule; and
the exception time reporting server reporting the first payroll time exception and the second payroll time exception to a workforce management function.

9. The method of claim 8, wherein the time period is a twenty-four hour day and a first previously observed login event and a last previously observed login event occurring during the time period indicate the beginning and the end of a measured work period, respectively.

10. The method of claim 8, wherein a payroll time exception is defined as one of a previously observed login event and a previously observed logout event occurring at one of a time earlier and a time later than a scheduled time and wherein a payroll time exception is further defined as a logged out period of time occurring during the measured work period, the logged out period commencing with a logout event and ending with a login event.

11. The method of claim 8, wherein the third payroll time exception is related to a restart of the computer and is one of two minutes, five minutes, and eight minutes in duration.

12. The method of claim 8, wherein coding supporting the dismissal of the fourth payroll time exception is inserted into the predetermined work schedule by a supervisory function.

13. The method of claim 8, wherein the first payroll time exception and the second payroll time exception cannot be resolved by the exception time reporting server locating at least one of coding, notation, and documentation associated with the predetermined work schedule and the exception time reporting server reporting the first payroll time exception and the second payroll time exception for resolution and remediation.

14. The method of claim 13, further comprising a software agent executing on the computer and reporting previously observed login events and previously observed logout events to the operations manager server.

15. A processor-implemented method of payroll time measurement and reporting, comprising:
a workforce management function receiving a report from an exception time reporting server, the report describing a first payroll time exception and a second payroll time exception to a predetermined work schedule associated with a client workstation during a single work shift, wherein the first payroll time exception occurs when a time of a first previously observed login event varies from a scheduled first login time by a time greater than a first predetermined threshold, and wherein the second payroll time exception occurs when a time of a second previous observed logout event varies from a scheduled second logout time by greater than a second predetermined time interval;
the workforce management function searching for and locating information on a network permitting resolution of the first payroll time exception;
the workforce management function searching for and not locating information permitting resolution of the second payroll time exception;
the workforce management function sending a message to an operations manager server requesting information about automatically dismissed payroll time exceptions during previous work shifts associated with the client workstation;
the workforce management function receiving information about the automatically dismissed payroll time exceptions and analyzing the second payroll time exception with reference to the automatically dismissed payroll time exceptions; and
the workforce management function forwarding the results of its analysis to a supervisory function for remediation.

16. The method of claim 15, wherein the information permitting resolution of the first payroll time exception is associated with one of a weather emergency, a fire drill, and a site event.

17. The method of claim 15, wherein the second payroll time exception remains unexplained and is noted as not excused after the workforce management function exhausts all available sources of information.

18. The method of claim 15, wherein the second payroll time exception is one of fifteen minutes and twenty minutes in duration.

19. The method of claim 15, wherein the workforce management function requests information on an ad hoc basis from the operations manager server to support investigation and analysis of unresolved payroll time exceptions.

20. The method of claim 15, wherein the workforce management function analyzing the second payroll time exception with reference to the automatically dismissed exceptions identifies a pattern of exceptions occurring at around the same time during each work shift.

* * * * *